United States Patent
Anerud

(10) Patent No.: US 8,959,790 B2
(45) Date of Patent: Feb. 24, 2015

(54) POSITIONING DEVICE FOR A DRAIN PIPE IN A DRYING CYLINDER

(75) Inventor: Johnny Anerud, Karlstad (SE)

(73) Assignee: Valmet AB, Sundsvall (SE)

( * ) Notice: Subject to any disclaimer, the term of this patent is extended or adjusted under 35 U.S.C. 154(b) by 161 days.

(21) Appl. No.: 13/818,431

(22) PCT Filed: Sep. 1, 2011

(86) PCT No.: PCT/SE2011/051052
§ 371 (c)(1),
(2), (4) Date: Feb. 22, 2013

(87) PCT Pub. No.: WO2012/033442
PCT Pub. Date: Mar. 15, 2012

(65) Prior Publication Data
US 2013/0153075 A1  Jun. 20, 2013

Related U.S. Application Data

(60) Provisional application No. 61/411,633, filed on Nov. 9, 2010.

(30) Foreign Application Priority Data

Sep. 8, 2010  (SE) ...................................... 1000911

(51) Int. Cl.
*D21F 5/10* (2006.01)
*F16L 3/00* (2006.01)

(52) U.S. Cl.
CPC .... *F16L 3/00* (2013.01); *D21F 5/10* (2013.01)
USPC ............. 34/124; 162/359.1; 219/469; 165/89

(58) Field of Classification Search
USPC ................... 34/117, 118, 119, 120, 124, 125; 219/469; 162/358.1, 359.1
See application file for complete search history.

(56) References Cited

U.S. PATENT DOCUMENTS 3,034,225 A * 5/1962 Hieronymus .................. 34/125
3,368,288 A   2/1968 Bell
(Continued)

FOREIGN PATENT DOCUMENTS

CN  2521241 Y  11/2002
CN  101353870 A  1/2009
(Continued)

OTHER PUBLICATIONS

International Searching Authority, International Search Report for International Application No. PCT/SE2011/051052, mailed Dec. 16, 2011, 5 pages, The Swedish Patent and Registration Office, Sweden.
(Continued)

*Primary Examiner* — Steve M Gravini
(74) *Attorney, Agent, or Firm* — Alston & Bird LLP

(57) ABSTRACT

A device for positioning a drain pipe (6) of a draining system in a drying cylinder (1), the jacket (2) of which has inner circumferential grooves (3) for condensate which is formed as a result of heat transfer, said draining system comprising an outlet means and a plurality of drain pipes which are connected to the outlet means, wherein the draining system removes the condensate from the grooves via the drain pipes and the outlet means, wherein the device has a pipe positioner (14) which is disposed in an end portion (12) of the drain pipe located closest to the outlet means, said pipe positioner comprising a mounting device (15) for mounting the drain pipe onto the outlet means, and a lockable connection (16) that connects the drain pipe to the mounting device (15). According to the invention, the lockable connection is a joint connection, which defines a fulcrum for pivoting of the drainpipe in a plane to enable positioning of the drain pipe relative to the bottom surface of the groove.

10 Claims, 9 Drawing Sheets

(56) References Cited

U.S. PATENT DOCUMENTS

| | | | |
|---|---|---|---|
| 3,943,638 A | | 3/1976 | Robson |
| 4,184,268 A | * | 1/1980 | Christin et al. ............ 34/124 |
| 4,476,637 A | | 10/1984 | Justus et al. |
| 4,590,688 A | | 5/1986 | Steffero, Sr. |
| 5,090,135 A | | 2/1992 | Wolf et al. |
| 5,537,756 A | | 7/1996 | Haessner et al. |
| 5,566,473 A | * | 10/1996 | Salminen ............ 34/454 |
| 5,699,626 A | * | 12/1997 | Chuang et al. ............ 34/453 |
| 5,701,682 A | * | 12/1997 | Chuang et al. ............ 34/115 |
| 8,438,752 B2 | * | 5/2013 | Mennucci et al. ............ 34/117 |
| 2009/0001717 A1 | | 1/2009 | Henry |
| 2011/0308814 A1 | * | 12/2011 | Menotti ............ 166/378 |
| 2013/0153075 A1 | * | 6/2013 | Anerud ............ 138/106 |
| 2013/0174437 A1 | * | 7/2013 | Anerud ............ 34/119 |

FOREIGN PATENT DOCUMENTS

| | | | | |
|---|---|---|---|---|
| DE | 2757579 A1 | | 5/1979 | |
| DE | 102010044072 A1 | * | 6/2011 | |
| EP | 2017517 A1 | | 1/2009 | |
| EP | 2298988 A1 | * | 3/2011 | |
| GB | 1059410 | * | 2/1967 | |
| WO | WO 9501477 A1 | * | 1/1995 | ............ D21F 5/10 |
| WO | WO 2012/033444 A1 | | 3/2012 | |

OTHER PUBLICATIONS

International Searching Authority, Written Opinion for International Application No. PCT/SE2011/051052, mailed Dec. 16, 2011, 4 pages, The Swedish Patent and Registration Office, Sweden.

The State Intellectual Property Office of China, First Office Action and Search Report for Application No. 201180035538.0, Jun. 20, 2014, 12 pages, China.

European Patent Office, Extended European Search Report for Application No. 11823844.3. Dec. 17, 2013, 6 pages, Germany.

* cited by examiner

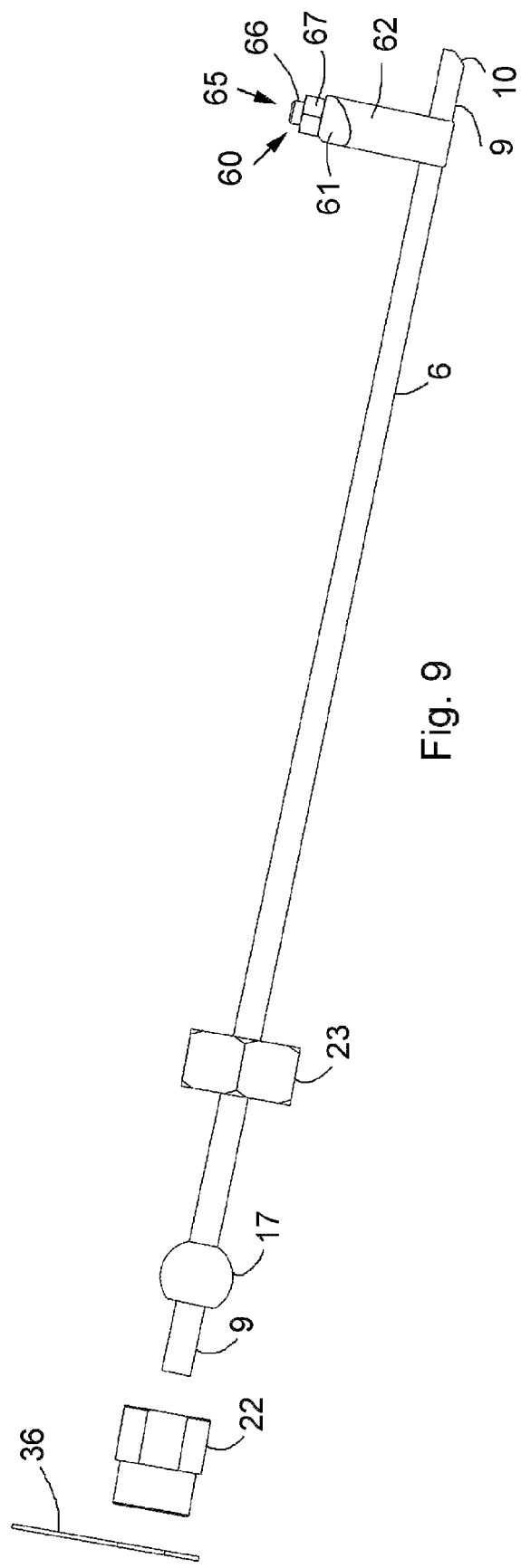
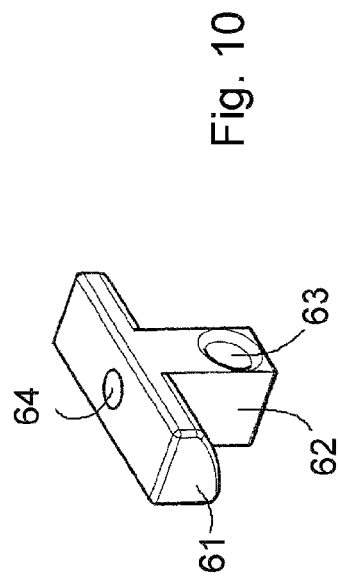
Fig. 9
Fig. 10

POSITIONING DEVICE FOR A DRAIN PIPE IN A DRYING CYLINDER

CROSS REFERENCE TO RELATED APPLICATIONS

This application is a national stage application, filed under 35 U.S.C. §371, of International Application No. PCT/SE2010/051052, filed Sep. 1, 2011, which claims priority to and the benefit of both U.S. Provisional Patent Application No. 61/411,633, filed Nov. 9, 2010, and Swedish Patent Application No. 1000911-6, filed Sep. 8, 2010, the contents of all of which are hereby incorporated by reference in their entirety.

BACKGROUND

1. Related Field

The present invention relates to a device for positioning a drain pipe of a draining system which is arranged in a steam-heated drying cylinder of a paper machine, said drying cylinder having a jacket which on its inside has circumferential grooves for collecting condensate that is formed as a result of heat transfer through the jacket to the outside thereof, said draining system comprising an outlet means which discharges on the outside of the drying cylinder, and a plurality of drain pipes which are arranged in a plurality of axial groups and connected to the outlet means, said draining system being adapted to remove the condensate from said grooves of the drying cylinder to the outside thereof via said plurality of drain pipes and outlet means, said device comprising a first pipe positioner which is disposed within an end portion of the drain pipe located closest to said outlet means, said pipe positioner comprising a mounting device for mounting the drain pipe onto the outlet means, and a lockable connection that connects the drain pipe to the mounting device.

2. Description of Related Art

Hitherto, a device of the above-described kind has been used where the end portion of the drain pipe facing toward the outlet means, and more precisely toward a collecting pipe, is provided with an external thread for screwing the drain pipe into the mounting device, which has a corresponding internal thread. Furthermore, the threaded portion of the drain pipe carries a locking nut, which is adapted to be brought into locking abutment against the mounting device, when the position of the drain pipe relative to the bottom surface of the groove has been decided. The position of the drain pipe relative to the bottom surface of the groove is thus set and adjusted by a rotation of the drain pipe about its axis so that it is screwed into or out of the mounting device. A disadvantage of the known device is that the length of the drain pipe is adapted to a particular drying cylinder and its diameter. Therefore, a range of drain pipes has to be provided for each size of drying cylinder, with respect to their diameters. Another disadvantage is that the mounting of the drain pipe is inconvenient and time-consuming in that it must be performed directly inside the drying cylinder, and, furthermore, in that the adjustment of the drain pipes has to be made one by one without being able to utilize the settings of a previous, already mounted drain pipe.

BRIEF SUMMARY

The object of the present invention is to achieve an improved positioning device for drain pipes, which eliminates the above-mentioned problems and which enables drain pipes with one and the same predetermined length to be used for several, with respect to the diameter, differently sized drying cylinders, and that the mounting of the drain pipes can be performed in a considerably faster, simpler and more convenient way than with the above-mentioned known device.

The positioning device according to the invention is characterized in that said lockable connection is a joint connection, which defines a fulcrum for pivoting of the drain pipe in at least one vertical plane to enable positioning of the drain pipe relative to the bottom surface of the groove.

BRIEF DESCRIPTION OF THE FIGURES

The invention will be described more closely with reference to the drawings.

FIGS. 8 and 9 show the positioning device in cross-section and from the side, respectively, wherein the second pipe positioner is of a known type.

FIG. 10 is a perspective view of the second pipe positioner according to FIGS. 8 and 9.

DETAILED DESCRIPTION OF VARIOUS EMBODIMENTS

Figure 1:
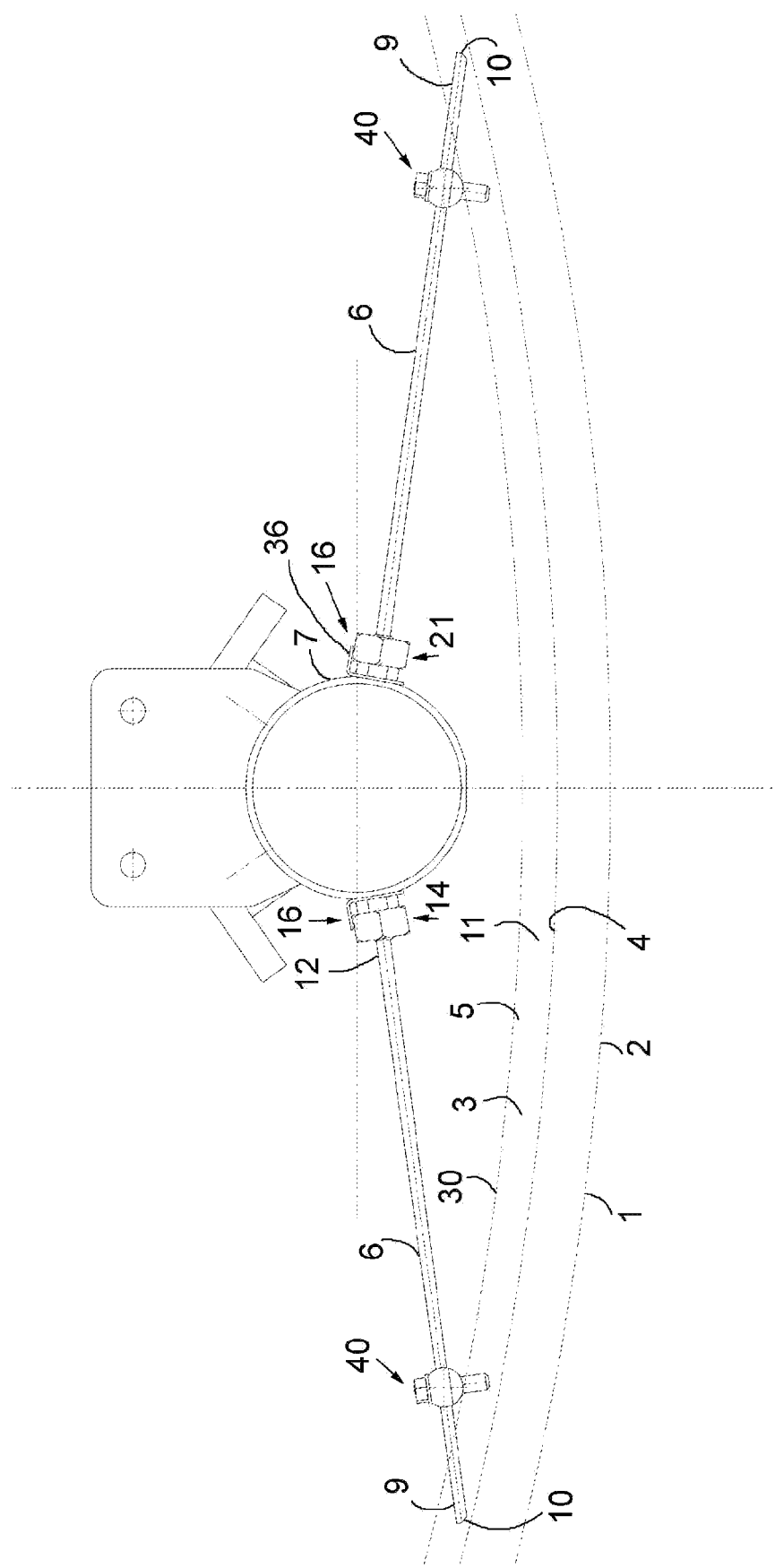
FIG. 1 is an end view of portions of a drying cylinder whose end wall has been removed, and shows two out of several positioning devices according to the invention of a draining system for condensate.
Figure 2:
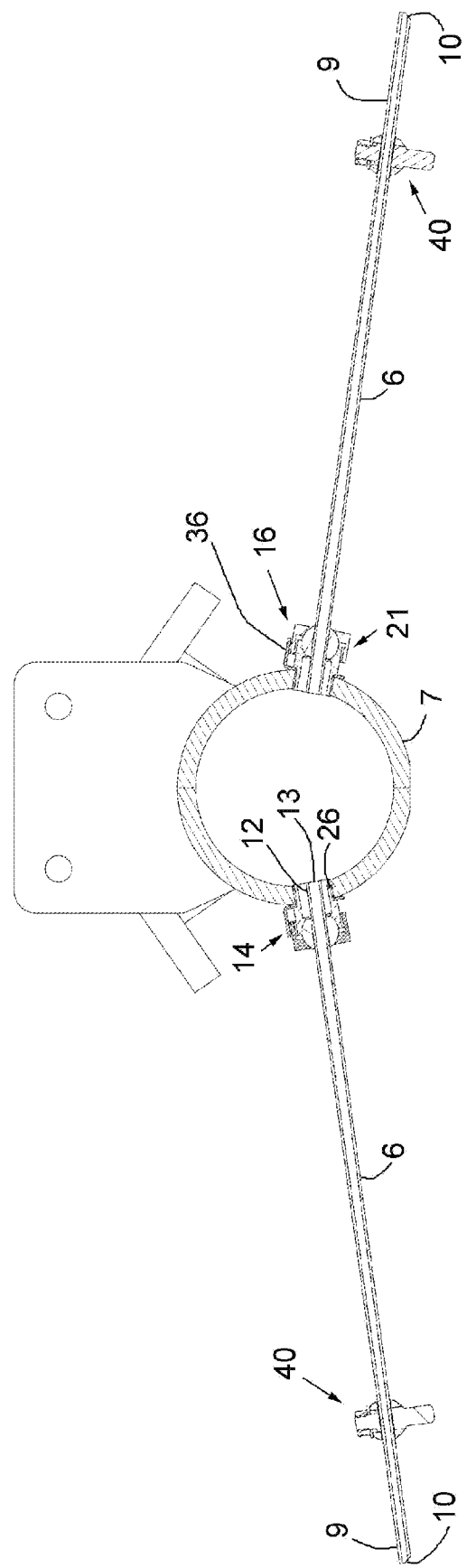
FIG. 2 shows the positioning devices in cross-section.

FIGS. 1 and 2 show an interior section of a steam-heated drying cylinder 1, which is installed in a drying section of a paper machine for manufacturing a paper web. The drying cylinder has a jacket 2, which has an outside, on which the paper web is dried, and an inside that is provided with a plurality of endless, circumferential grooves 3, evenly distributed in an axial direction, whose centres coincide with the centre axis of the drying cylinder 1. Suitably, the grooves 3 have a round, concave bottom surface 4. The grooves 3 define ridges 5 between them, wherein the top surfaces 30 of the ridges 5 and the bottom surfaces 4 and lateral walls of the grooves 3 together form an inner jacket surface for heat transfer. Such internally grooved drying cylinders 1 are used, inter alia, in the drying section of a tissue paper machine for manufacturing tissue paper, and then have a relatively large diameter which can vary from one machine to another. Furthermore, the drying cylinder 1 has a hollow central hub and two opposite axle journals, which are connected to the central hub to extend out through the opposite lateral end walls of the drying cylinder 1. The drying cylinder 1 is rotatably journalled by means of the axle journals, which thus define the axis of rotation of the drying cylinder 1.

The energy for drying the paper web is supplied in the form of steam to the interior space of the drying cylinder 1. The steam condenses on the inner jacket surface, and the heat is conducted through the jacket 2 to its outside, with which the paper web is in contact. During operation, condensate in the form of a film is accumulated on the bottom surface of each groove 3, said condensate film primarily determining the transition resistance from steam to jacket. An efficient heat flow requires that the grooves 3 are kept as free as possible from condensate. A special draining system for condensate, comprising a plurality of elongated drain pipes 6 which commonly are called suction pipes and are arranged in a plurality of evenly distributed groups around the inside of the jacket 2, is used for draining each groove 3 from condensate as efficiently as possible. Furthermore, the draining system comprises an outlet means which comprises, in order, a plurality of axially arranged collecting pipes 7, a stand pipe from each collecting pipe 7, a common centre connection for the stand pipes through said central hub and through one of the axle journals to the outside of the drying cylinder 1 for further transport. Accordingly, the number of collecting pipes 7 corresponds to the number of said groups. The collecting pipes 7 are arranged eccentrically and axially relative to the centre axis of the drying cylinder 1.

Figure 11:
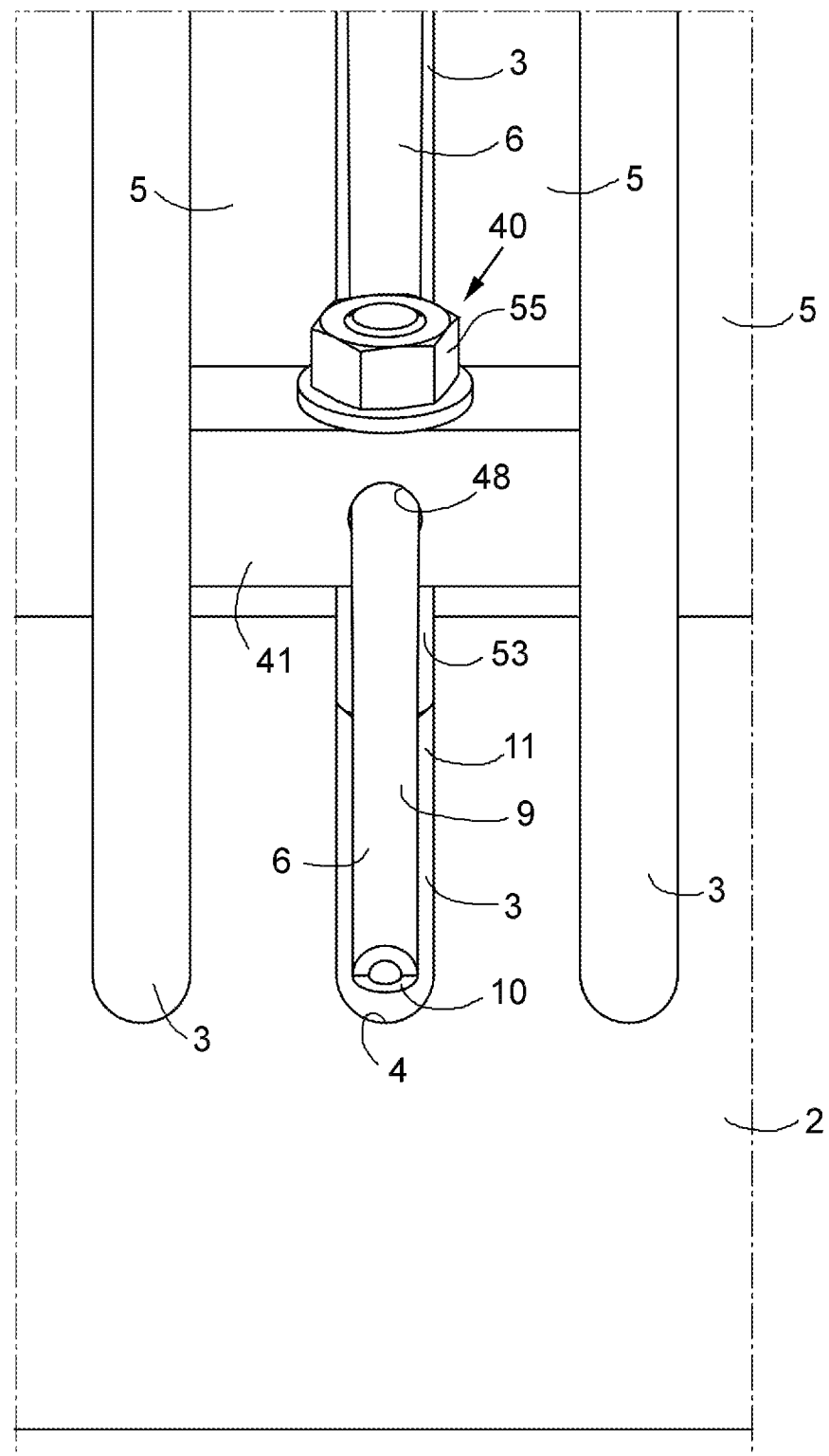
FIG. 11 is a cross-section of the jacket of the drying cylinder, along the line XI-XI in FIG. 3, and shows the drain pipe and the second pipe positioner.

Each drain pipe 6 has an end portion 9 having an open end 10, with which the space 11 of the groove 3 stands in open communication, and an end portion 12 having an open end 13 that opens into the collecting pipe 7, see FIG. 2. During operation, the opening 10 of the end portion 9 should be disposed at a predetermined distance from the bottom surface 4 of the groove 3, as is evident from FIGS. 1 and 11.

Each drain pipe 6 is provided with a device for positioning the drain pipe 6 relative to the inside of the jacket 2, and more precisely relative to the bottom surface 4 of the groove 3, in order to maintain said predetermined distance. The device comprises a first pipe positioner or pipe position adjuster 14, which is disposed in the end portion 12. The first pipe positioner 14 comprises a mounting device 15, see FIGS. 3 and 4, for mounting the drain pipe 6 onto the collecting pipe 7, and a lockable connection 16 that connects the drain pipe 6 to the mounting device 15. According to the present invention, said connection 16 is a lockable joint connection which, in an unlocked condition, articulately connects the drain pipe 6 to the mounting device 15. The joint connection 16 forms a fulcrum for pivoting of the drain pipe 6 in at least one vertical plane, i.e. a plane coinciding with the centre plane of the groove 3 that intersects the centre axis of the drying cylinder 1 at right angles. The degree of said pivoting is made in dependence on the diameter of the drying cylinder 1 and the depth of the groove 3, so that an open end 10 of the drain pipe 6 comes to be located at a predetermined distance from the bottom surface 4 of the groove 3. Thereby, the joint connection 16 comprises an inner joint body 17, see FIG. 3, which is permanently mounted, e.g. by means of welding, onto the drain pipe 6 at a predetermined distance from said open end 10 of the said end portion 9 of the drain pipe 6. The inner joint body 17 is designed with a curved, outer joint surface 18, which comprises surface portions 19, 20 at least facing forward and backward, as seen in the longitudinal direction of the drain pipe 6 and in a direction toward the collecting pipe 7. Furthermore, the joint connection 16 comprises an outer joint body 21, which consists of a first portion 22 and a second portion 23, see FIGS. 3 and 4, which are detachably connected to each other and which together enclose the inner joint body 17. Each joint body portion 22, 23 is provided with an inner joint surface 24 and 25, respectively, see FIG. 4, which has the same shape and same radius as the joint surface 18 of the inner joint body 17. The two joint body portions 22, 23 are adapted to be joined together into a unit, i.e. into said outer joint body 21, wherein their curved, inner joint surfaces 24, 25 facing each other are adapted to interact with the curved joint surface 18 of the inner joint body 17 to produce in a first, initial position, a slidable interaction between the joint surfaces 18, 24, facing each other, in which initial position the drain pipe 6 has a possibility to pivot about said fulcrum, which is thus defined by the joint surfaces 18, 24, 25, as has been described above. If continuing the forced bringing together of the two joint body portions 22, 23 in a direction toward each other, the friction between the joint surfaces 18, 24, 25 facing each other increases, until a completely locked position of the joint connection 16 is achieved, whereby the drain pipe 6 becomes fixed against pivoting about said fulcrum. Suitably, the mounting device 15 and the joint body portion 22 located closest to the joint body 17 are made in one piece, as is evident from FIGS. 3 and 4. The mounting device 15 and the outer joint body 21 have axially through-going centre holes 31, 32, see FIG. 4, which have a larger diameter than the drain pipe 6 to thereby enable said pivoting of the drain pipe 6.

In the shown embodiment of the lockable joint connection 16, it is constituted by a ball joint, wherein said curved joint surfaces 18, 24, 25 are spherical, whereby the drain pipe 6 becomes pivotable in all directions. The mounting device 15 for mounting the drain pipe 6 onto the collecting pipe 7 comprises an externally threaded sleeve for screwing into an internally threaded hole 26 in a wall of the collecting pipe 7, said threaded hole connecting to the interior of the collecting pipe 7. The centre axis of the hole 26 is directed toward the region of the groove 3 where the drain pipe 6 is to suck condensate. It will be appreciated that all mounting holes 26 of the collecting pipe 7 have their centre axes aligned in the same way toward their corresponding regions, which thus will be located on, and intersected by, a common axial line. A screw depth stop 27 is formed at the transition to the ball joint 16. The first joint body portion 22 is cylindrical and has an external thread. In the shown embodiment, this first joint body portion 22 and said sleeve 15 are designed in one piece, wherein said screw stop 27 is formed by a radial, circumferential surface at the transition therebetween in that the first joint body portion 22 has a larger diameter than the sleeve 15. The second joint body portion 23 has the shape of a nut, having an internal thread and a diameter at this thread portion which are adapted to the outer diameter of the first joint body portion 22 and its thread, so that the nut 23 can be screwed onto the first joint body portion 22 for the formation of a screw connection while enclosing the inner spherical joint body 17. The side of the nut 23 facing away from the thread portion has a wall 28 that is provided with a centre hole 29, through which the drain pipe 6 extends and which also allows that a small portion of the inner, spherical joint body 17 can project therefrom to thereby enable the drain pipe 6 to be pivoted in the desired manner, when the ball joint is in a loosened state. The reference numeral 36 designates a securing plate, which is carried by the sleeve 15 and is foldable down over the nut 23 so that it is locked against being loosened, as is evident from FIGS. 1-4.

The positioning device further comprises a second pipe positioner or pipe position adjuster 40, which is disposed in said end portion 9 of the drain pipe 6 that is located closest to the jacket 2. The second pipe positioner 40 comprises a supporting body 41, which is designed for resting on the top surfaces 30 of two successive ridges 5 to extend in a direction transversely across the groove 3 located therebetween. The supporting body 41 is delimited by two end surfaces 42, 43 facing away from each other, two lateral surfaces 44, 45 facing away from each other, an upper surface 46 and a lower surface 47, said lateral surfaces 44, 45 and upper and lower surfaces 46, 47 extending between said end surfaces 42, 43. Preferably, at least the lower surface 47 is curved as shown, e.g. circular-cylindrically. A first imaginary plane extends through the end surfaces 42, 43 and the upper and lower surfaces 46, 47. A second imaginary plane extends through the two end surfaces 42, 43 and the two lateral surfaces 44, 45, and intersects the said first plane at right angles. The planes may define centre planes of the supporting body 41, but one of the planes, or both, may be located slightly to the side of said centre plane.

A first through hole 48 extends between the lateral surfaces 44, 45 and has a diameter that is slightly larger than the diameter of the drain pipe 6 for receiving the drain pipe 6 therein with a sliding fit, so that the supporting body 41 can be displaced along the drain pipe 6 to a desired position relative to the end 10 of the end portion 9 of the drain pipe 6, or alternatively said fulcrum of the drain pipe 6. The first hole 48 has a centre axis that coincides with said second plane. Furthermore, a second through hole 49 is adapted to extend between the upper surface 46 and the lower, curved surface 47, said second hole 49 having a larger diameter than the first hole 48. The second hole 49 has a centre axis that coincides with said first plane. The centre axes of the two holes 48, 49 intersect each other at right angles, and their common intersection point coincides with the intersection point of the two said planes.

The second pipe positioner 40 further comprises a multifunctional, elongated pin 50, which comprises a central portion 51 that is designed to be received in the said second hole 49 with a sliding fit, wherein the portion 51 thus has a diameter that is slightly smaller than the diameter of the second hole 49. The said portion is provided with a diametrical through hole 52, which has the same diameter as the first, smaller hole 48 of the supporting body 41 to thereby be aligned with the last-mentioned hole 48, so that the drain pipe 6 can be inserted into the smaller hole 48 of the supporting body 41 from one end and further through the hole 52 of the pin portion, and then further through the smaller hole 48 of the supporting body 41 and out through its other end. In that way, a unit is produced which is slidable along the drain pipe 6 to be displaced and set to the desired position, when said predetermined distance between the bottom 4 of the groove 3 and the open end 10 of the drain pipe 6 has been reached. Furthermore, the pin 50 comprises a lower guiding and supporting portion 53, which extends from the lower surface 47 to be received in the groove 3 with the purpose of guiding and supporting the pipe positioner 40 in the groove, so that the drain pipe 6 is maintained in the correct, aligned position.

The length of the lower guiding and supporting portion 53 is smaller than the depth of the groove 3. The second pipe positioner 40 further comprises a locking device 54 for locking the three structural members 6, 41, 50 to each other. Such a locking device 54 can be designed and arranged in a plurality of different ways. In the shown embodiment, it comprises a nut 55 and an upper threaded portion 56 of the pin 50, projecting from the upper surface 46 of the supporting body 41, onto which threaded portion the nut 55 is screwed, to finally abut against the upper surface 46 of the supporting body 41 and be tightened so that the supporting body 41, the drain pipe 6 and the pin 50 are locked to each other. If a position adjustment has to be made, the nut 55 needs to be loosened one or a few turns until the engagement is released, so that the second pipe positioner 40 can be displaced along the drain pipe in the desired direction. In order to reduce the weight of the supporting body 41, it can be provided with recesses, on both sides of the hole 49 and extending downward a suitable distance in a direction from the upper surface 46, e.g. half of the distance down to the lower surface.

Figure 8:
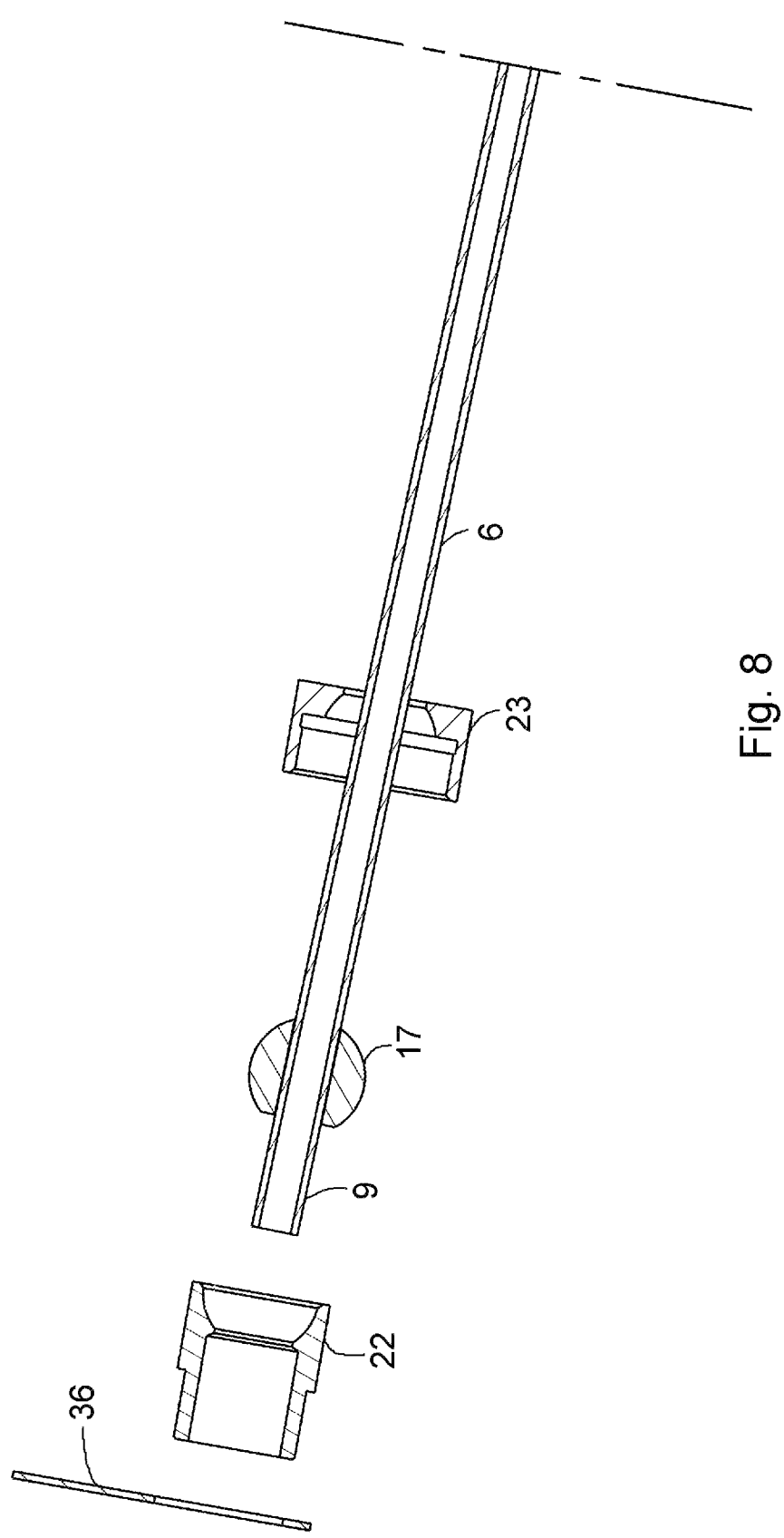

FIG. 8 shows another embodiment of a second pipe positioner 60 of the type that is used in the previously known positioning device, but which can also be used in combination with the first pipe positioner 14 according to the present invention. The second pipe positioner 60 according to FIGS. 8, 9 and 10 has a transverse supporting body 61 for abutting against two adjacent ridges 5, and a carrying body 62 which projects perpendicularly from the supporting body 61 to be received in the groove 3. At its lower end portion, the carrying body 62 is provided with a smooth through hole 63, see FIG. 10, for receiving the drain pipe 6. A threaded hole 64 extends from the top side of the supporting body 61 downward therethrough, and further through the carrying body 62 all the way to the said smooth hole 63. A locking device 65, comprising a threaded rod 66, is screwed into the threaded hole 64 for abutting against the drain pipe 6 and locking it in the desired position for the drain pipe 6, said position being locked by means of a locking nut 67 carried by the threaded rod 66, see FIG. 10. This embodiment of the pipe positioner 40, having a T-shape, is made for use in a groove 3 of a particular depth. A different groove depth thus requires a T-shaped pipe positioner whose carrying body 62 is shorter or longer in dependence on said groove depth.

Figure 3:
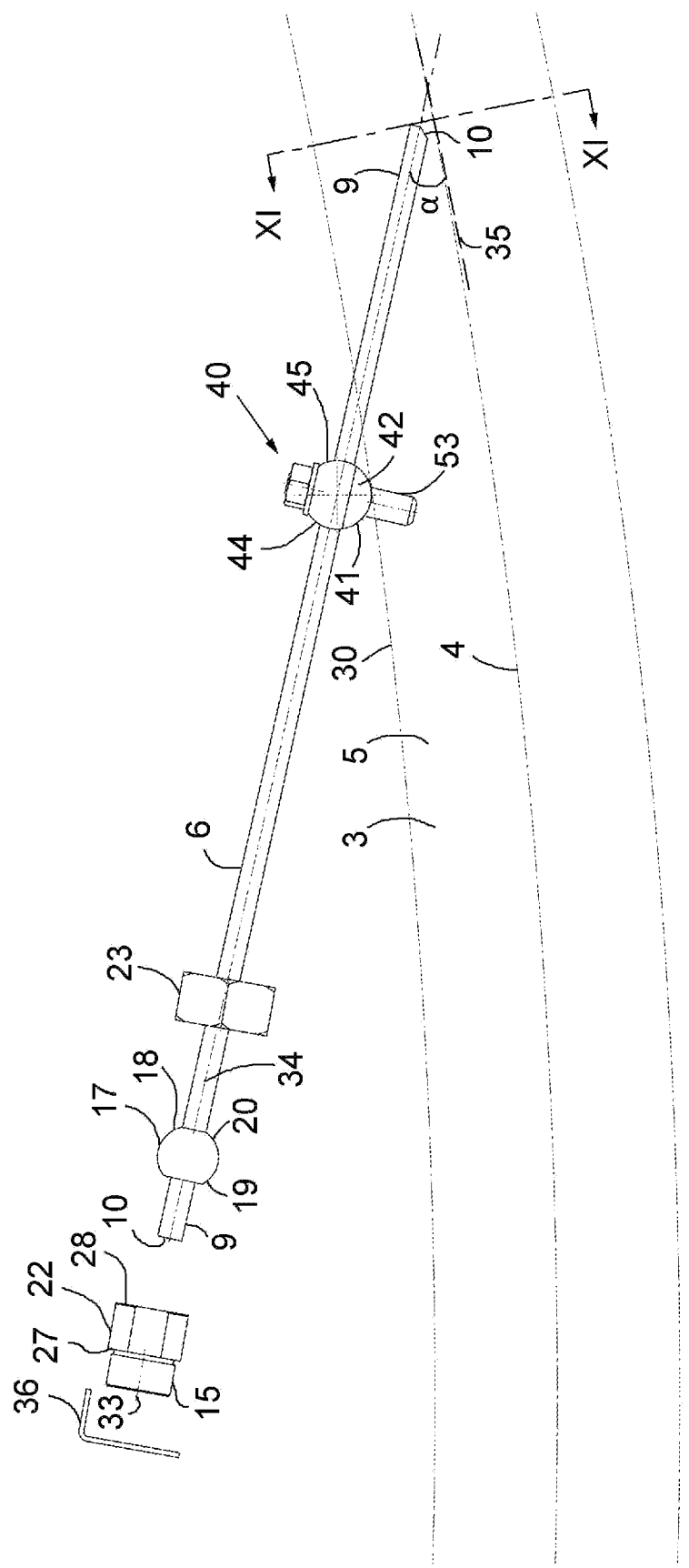
FIG. 3 shows one of the positioning devices, comprising a drain pipe and first and second pipe positioners, before mounting onto a collecting pipe of the draining system.
Figure 4:
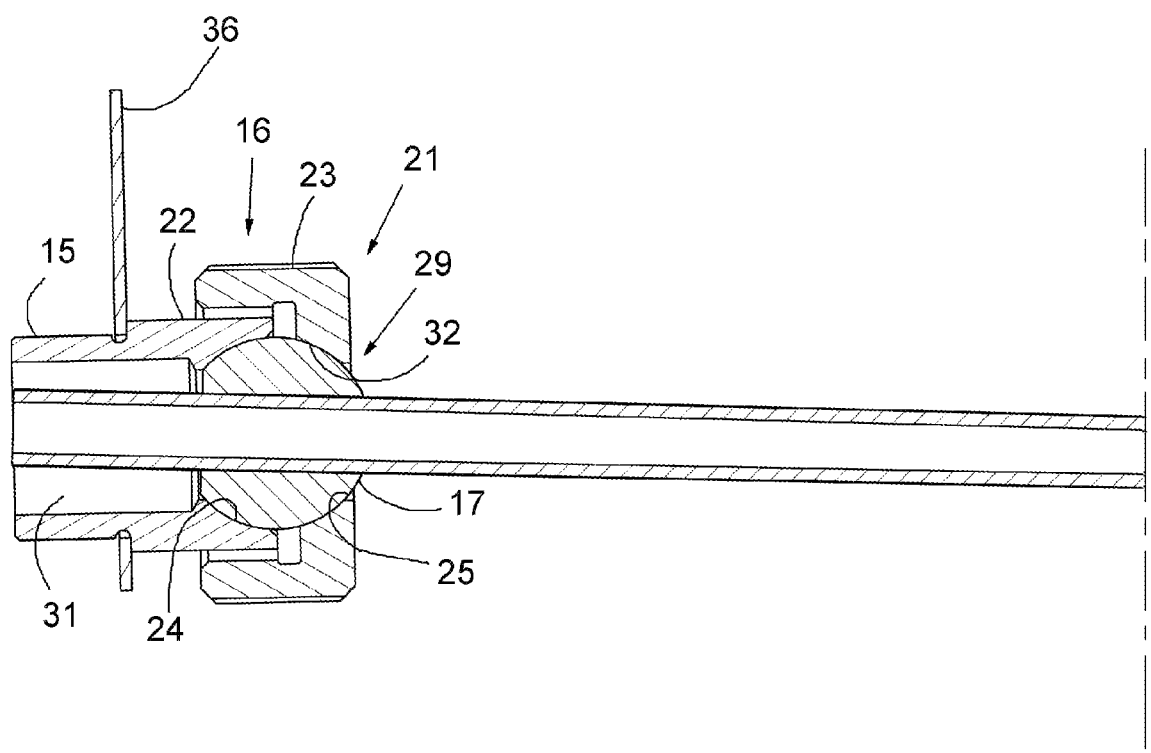
FIG. 4 shows the first pipe positioner in cross-section.
Figure 5:
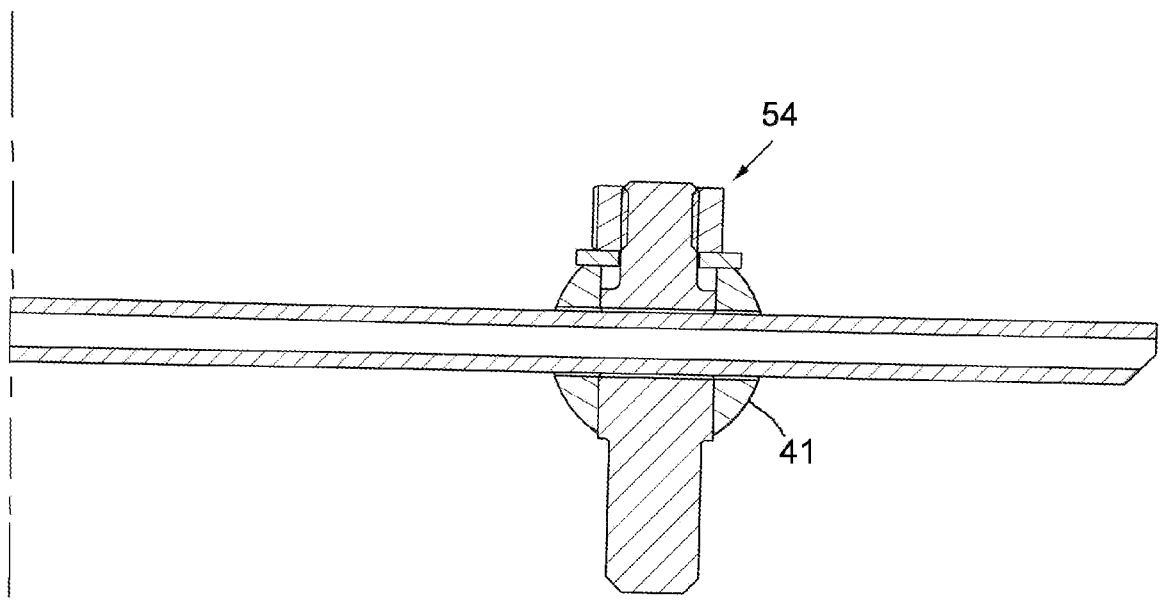
FIG. 5 shows the second pipe positioner in cross-section.
Figure 7:
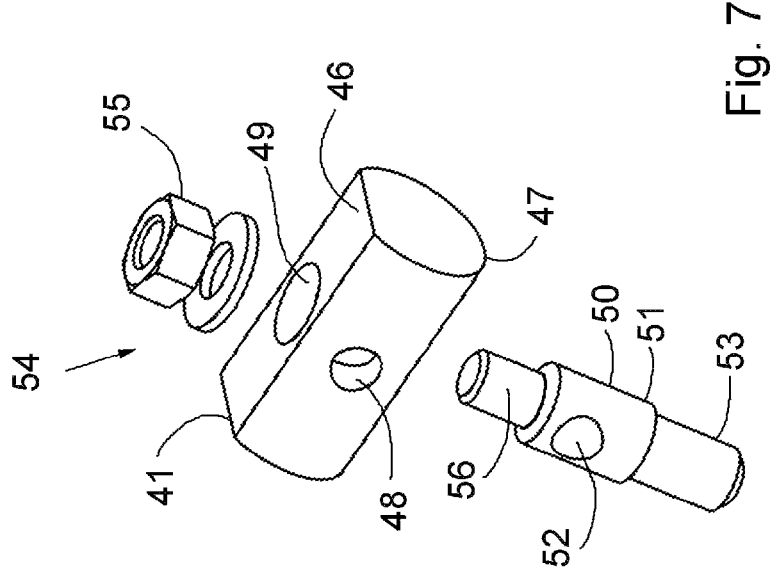
FIGS. 6 and 7 show the second pipe positioner with its different parts separated.
Figure 6:
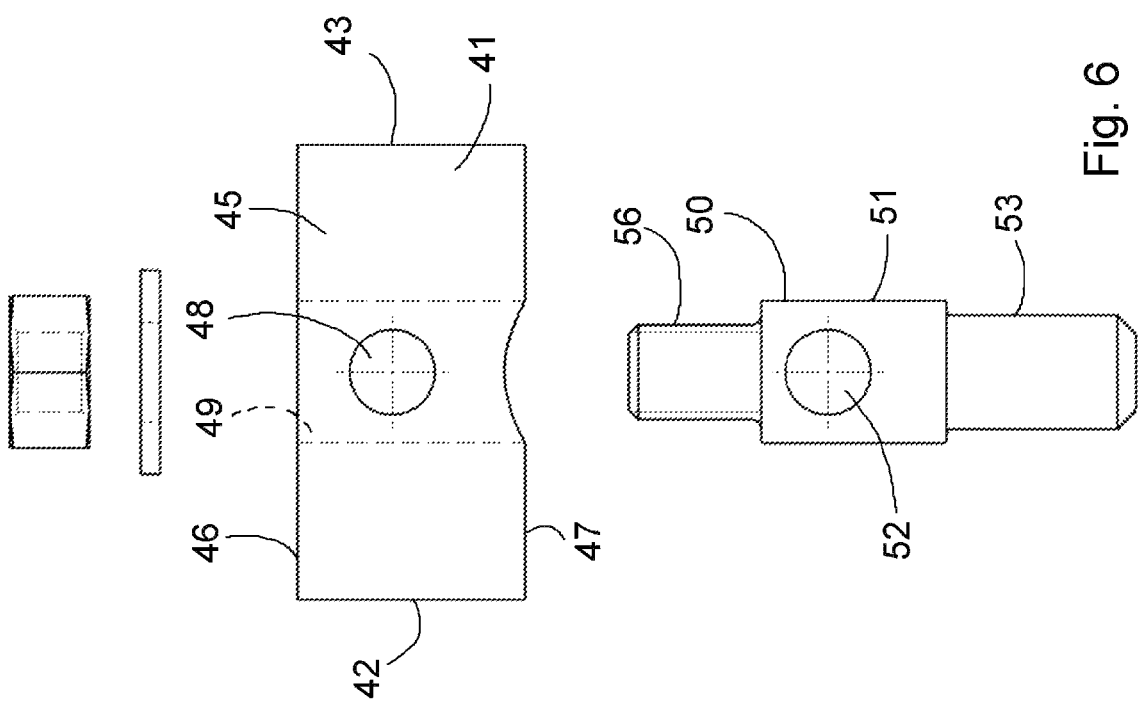

The first pipe positioner according to the invention enables one and the same length of the drain pipe 6 to be used for drying cylinders 1 having different diameters in that the first pipe positioner 14 is pivoted relative to the mounting axis 33, see FIG. 3, which is defined by the mounting device 15 that is fixed to the collecting pipe 7, so that the centre axis of the drain pipe 6, see FIG. 3, forms an obtuse angle with the mounting axis 33, wherein the centre axis 34 thus may extend downward, as is shown in FIG. 3, or upward relative to the fixed mounting axis 33. In both cases, the centre axis 34 forms an acute angle α, see FIG. 3, with its tangent 35 in the intersection point with the bottom surface 4 of the groove 3 (or with the outside of the jacket 2). The mounting of the drain pipes 6 can be performed in a faster, simpler and more convenient way in that it is only necessary to mount a first drain pipe 6 onto the collecting pipe 7, and thereby to set a desired angle, which is fixed by the nut 23 of the ball joint 16, whereafter the mounting device 15 is once again detached from the collecting pipe 7 to be used as a template for setting the corresponding angle of the other drain pipes 6 of the collecting pipe 7, which operation consequently can be carried out outside of the drying cylinder 1, whereafter the thus pre-positioned drain pipes 6 with associated devices can be mounted onto the collecting pipe 7 inside the drying cylinder 1. If an adjustment of an angle has to be made, this is a simple operation of loosening the nut 23 of the ball joint 16 to enable pivoting of the drain pipe 6 up or down depending on the degree of required adjustment. In the above-mentioned operations, the correct angle has been achieved when the open end 10 of the drain pipe 6 facing toward the jacket 2 is located at a predetermined distance from the bottom surface 4 of the groove 3. This distance is normally 3-5 mm. This distance is made permanent by means of the second pipe positioner 40 or 60, which is already pre-positioned on the drain pipe 6, but which can be readjusted if necessary. The second pipe positioner 40, 60 is necessary for absorbing the centrifugal forces acting on the drain pipe 6 during operation, and which otherwise would press the end portion 9 of the drain pipe 6 inward in a direction toward the bottom surface 4 of the groove 3. In certain cases, e.g. when the drain pipe is relatively short and/or is extra rigid, it may be possible to omit the second pipe positioner 40 or 60.

A device according to the invention that also includes a second pipe positioner 40 makes it possible to use for all drying cylinders 1 regardless of the depth of the grooves 3 on the inside of the jacket 2.

In the described embodiment having a ball joint 16, the fulcrum of the drain pipe 6 is thus defined by the centre point of the spherical joint surface 18 of the ball joint 16. In an alternative embodiment of the joint connection 16, the joint surface is cylindrical, defining a horizontal centre axis, which thus constitutes the fulcrum of the drain pipe 6.

The invention claimed is:

1. A device for positioning a drain pipe (6) of a draining system that is arranged in a steam-heated drying cylinder (1) of a paper machine, said drying cylinder (1) having a jacket (2) which on its inside has circumferential grooves (3) for collecting condensate that is formed as a result of heat transfer through the jacket (2) to the outside thereof, said draining system comprising an outlet means which discharges on the outside of the drying cylinder (1), and a plurality of drain pipes (6) which are arranged in a plurality of axial groups and connected to the outlet means, said draining system being adapted to remove the condensate from said grooves (3) of the drying cylinder (1) to the outside thereof via said plurality of drain pipes (6) and outlet means, said device comprising a first pipe positioner (14) which is disposed within an end portion (12) of the drain pipe (6) located closest to said outlet means, said pipe positioner (14) comprising a mounting device (15) for mounting the drain pipe (6) onto the outlet means, and a lockable connection (16) that connects the drain pipe (6) to the mounting device (15), characterized in that said lockable connection (16) is a joint connection which defines a fulcrum for pivoting of the drain pipe (6) in at least one vertical plane to enable positioning of the drain pipe (6) relative to the bottom surface (4) of the groove (3).

2. The device according to claim 1, wherein the degree of said pivoting is made in dependence on the diameter of the drying cylinder (1) and the depth of the groove (3), so that an open end (10) of the drain pipe (6) comes to be located at a predetermined distance from the bottom surface (4) of the groove (3).

3. The device according to claim 1, wherein the joint connection (16) comprises:
an inner joint body (17) which is fixedly arranged on the drain pipe (6) at a predetermined distance from the open end (13) of the end portion (12) and which is designed with a curved joint surface (18); and
an outer joint body (21) that consists of a first portion (22) and a second portion (23) which are detachably connected to each other and which together are adapted to enclose the inner joint body (17), said joint body portions (22, 23) having inner joint surfaces (24, 25) which are adapted to the joint surface (18) of the inner joint body (17) for slidable interaction during said pivoting of the drain pipe (6) and for locking frictional interaction in each set position of the drain pipe (6).

4. The device according to claim 3, wherein the mounting device (15) and the body portion (22) of the outer joint body (21) located closest thereto are made in one piece.

5. The device according to claim 3, wherein the mounting device (15) and the outer joint body (21) have axially through-going center holes which have a larger diameter than the drain pipe (6) to thereby enable said pivoting of the drain pipe (6).

6. The device according to claim 1, wherein the lockable joint connection (16) is a ball joint with spherical joint surfaces (18, 24, 25).

7. The device according to claim 1, further comprising a second pipe positioner (40; 60) that is disposed in an end portion (9) of the drain pipe (6) that is located closest to the jacket (2), the second pipe positioner comprising:
a supporting body (41; 61) which is designed for resting on the top surfaces (30) of two ridges (5) located adjacent to each other; and
a locking device (54; 65) for fixing the drain pipe (6) to the pipe positioner (40; 60), wherein the pipe positioner is provided with:
a first through hole (48; 63) for receiving the drain pipe (6); and
a second hole (49; 65) for receiving the locking device (54; 65), said second hole (49; 65) opening into the first hole (48; 63).

8. The device according to claim 7, wherein said first hole (48) is disposed in the supporting body (41).

9. The device according to claim 8, wherein the portion (51) of the locking device (54) that is located in the supporting body (41) is provided with a third through hole (52) adapted to interact with and be aligned with the first hole (48) of the supporting body (41), so that the drain pipe (6) extends through both the supporting body (41) and the locking device (54), wherein the locking device (54) is adapted to enclose the drain pipe (6) and be brought to a locked position in interaction with the supporting body (41) in which locked position the drain pipe (6), the supporting body (41) and the locking device (54) are fixed to each other.

10. The device according to claim 9, wherein the second hole (49) for the locking device (54) is through-going and the locking device (54) comprises a lower, free guiding and supporting portion (53), which is adapted to project from the supporting body (41) to be freely received in the jacket groove (3).

* * * * *